(12) United States Patent
Thurfjell et al.

(10) Patent No.: US 11,342,982 B2
(45) Date of Patent: May 24, 2022

(54) DETERMINATION OF DIRECTIONAL BEAMFORMING WEIGHTS

(71) Applicant: Telefonaktiebolaget LM Ericsson (publ), Stockholm (SE)

(72) Inventors: Magnus Thurfjell, Luleå (SE); Arne Simonsson, Gammelstad (SE); Christina Larsson, Mölndal (SE); Jonas Medbo, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/762,029

(22) PCT Filed: Dec. 11, 2017

(86) PCT No.: PCT/SE2017/051243
§ 371 (c)(1),
(2) Date: May 6, 2020

(87) PCT Pub. No.: WO2019/117762
PCT Pub. Date: Jun. 20, 2019

(65) Prior Publication Data
US 2020/0266874 A1 Aug. 20, 2020

(51) Int. Cl.
*H04B 7/08* (2006.01)
*H04B 17/364* (2015.01)
(Continued)

(52) U.S. Cl.
CPC ........... *H04B 7/086* (2013.01); *H04B 7/0617* (2013.01); *H04B 17/364* (2015.01);
(Continued)

(58) Field of Classification Search
CPC .............. H04L 5/0048; H04L 27/2607; H04L 25/0204; H04L 25/0242; H04B 7/086; H04B 17/364; H04B 7/0617
See application file for complete search history.

(56) References Cited

U.S. PATENT DOCUMENTS

2004/0071222 A1 4/2004 Liang et al.
2004/0246889 A1 12/2004 Ogawa et al.
(Continued)

OTHER PUBLICATIONS

PCT International Search Report and Written Opinion dated Oct. 19, 2018 for International Application No. PCT/SE2017/051243, 12 pages.
(Continued)

*Primary Examiner* — Sung S Ahn
(74) *Attorney, Agent, or Firm* — Sage Patent Group (57) ABSTRACT

Mechanisms for determining directional beamforming weights are disclosed. A method performed by a radio transceiver device includes obtaining, from measurements on reference signals, channel estimates per antenna port and frequency. The channel estimates are indicative of power delay values per antenna port towards another radio transceiver device. The method includes determining modified channel estimates per antenna port and frequency with the power delay values outside a threshold delay window being suppressed. The method includes determining directional beamforming weights for beam-formed transmission towards said another radio transceiver device based on the modified channel estimates per antenna port and frequency.

19 Claims, 4 Drawing Sheets

(51) Int. Cl.
H04B 7/06 (2006.01)
H04L 25/02 (2006.01)
H04L 27/26 (2006.01)

(52) U.S. Cl.
CPC ...... H04L 25/0204 (2013.01); H04L 25/0242 (2013.01); H04L 27/2607 (2013.01)

(56) References Cited

U.S. PATENT DOCUMENTS

| | | | |
|---|---|---|---|
| 2007/0147533 A1* | 6/2007 | Thomas | H04B 7/0617 375/267 |
| 2008/0170554 A1 | 7/2008 | Wang et al. | |
| 2016/0248484 A1 | 8/2016 | Sayeed et al. | |
| 2017/0288759 A1* | 10/2017 | Namgoong | H04B 7/0456 |

OTHER PUBLICATIONS

Extended European Search Report for European Patent Application No. 17934571.5 dated Jul. 6, 2021, 8 pages.

* cited by examiner

DETERMINATION OF DIRECTIONAL BEAMFORMING WEIGHTS

CROSS-REFERENCE TO RELATED APPLICATIONS

This application is a 35 U.S.C § 371 national stage application for International Application No. PCT/SE2017/051243, entitled "DETERMINATION OF DIRECTIONAL BEAMFORMING WEIGHTS", filed on Dec. 11, 2017, the disclosures and contents of which are hereby incorporated by reference in their entireties.

TECHNICAL FIELD

Embodiments presented herein relate to a method, a radio transceiver device, a computer program, and a computer program product for determining directional beamforming weights.

BACKGROUND

In communications networks, there may be a challenge to obtain good performance and capacity for a given communications protocol, its parameters and the physical environment in which the communications network is deployed.

A communications channel between a transmitter and a receiver (such as between two radio transceiver devices) typically consists of multiple radio propagation paths. The different radio propagation paths are either line-of-sight (LOS), diffracted around, or reflected on objects in the radio propagation environment. These radio propagation paths will differ in direction and/or path length. The variance of path length can be measured and quantified as delay spread.

The delay spread could give rise to so called inter-symbol interference (ISI), i.e. interference to the current symbol from one or more previous or subsequent symbols. ISI is generally caused by a too large delay difference between different radio propagation paths.

In some communications systems ISI might be mitigated, or reduced, by the use of a so-called a cyclic prefix, whereby the symbol time is extended to allow for a specified range of delay difference between the different paths radio propagation. This however comes at a cost since symbol rate will be reduced. The length of the cyclic prefix should therefore be kept as short as possible. For example, Long Term Evolution (LTE) based communications systems could be configured with an extended cyclic prefix for radio propagation environments with large delay spreads, which reduces the fraction of time available for transmission of user data symbols.

Numerology generally refers to waveform parametrization, e.g., cyclic prefix, subcarrier spacing (SCS), sample rates, etc. in orthogonal frequency-division multiplexing (OFDM) based communications networks, see "Waveform and Numerology to Support 5G Services and Requirements" by Ali A. Zaidi et al in IEEE Communications Magazine, Volume 54, Issue 1, Pages 90-98, 15 Nov. 2016. Some communications systems, such as the fifth generation (5G) telecommunications system, have a flexible numerology enabling configurable SCS. An environment with large delay spread generally requires a large cyclic prefix. To avoid an increased overhead and lower bitrate, a narrower SCS (which means longer symbols) will then be selected to keep the relative part of the time used for cyclic prefix unchanged. A longer subframe length increases the reporting and retransmission time, which results in longer delay. Further, although a numerology is selected that gives short delays for some radio transceiver devices, or even a majority of the radio transceiver devices, there could be other radio transceiver devices that still suffer from having long delays.

Hence, there is still a need for an improved handling of delay spread.

SUMMARY

An object of embodiments herein is to provide efficient handling of delay spread that do not suffer from, or result in, the above noted disadvantages, or at least where the above denoted disadvantages are mitigated or reduced.

The inventors of the herein disclosed embodiments have realized that with transmit beamforming (i.e., when energy representing a radio signal is transmitted in directional beams having a certain shape, or beam pattern), an adaption to the different radio propagation path directions could be made to optimize the transmitted energy. One example of beamforming is so-called reciprocity based beamforming. In general terms, reciprocity based beamforming relies on radio propagation channel estimates of the received radio propagation channel when determining transmit beamforming weights.

A particular object of the embodiments disclosed herein is therefore to determine directional beamforming weights that do not cause the above noted disadvantages to occur, or at least where the above denoted disadvantages are mitigated or reduced.

According to a first aspect there is presented a method for determining directional beamforming weights. The method is performed by a radio transceiver device. The method comprises obtaining, from measurements on reference signals, channel estimates per antenna port and frequency. The channel estimates are indicative of power delay values per antenna port towards another radio transceiver device. The method comprises determining modified channel estimates per antenna port and frequency with the power delay values outside a threshold delay window being suppressed. The method comprises determining directional beamforming weights for beam-formed transmission towards said another radio transceiver device based on the modified channel estimates per antenna port and frequency.

According to a second aspect there is presented a radio transceiver device for determining directional beamforming weights. The radio transceiver device comprises processing circuitry. The processing circuitry is configured to cause the radio transceiver device to obtain, from measurements on reference signals, channel estimates per antenna port and frequency. The channel estimates are indicative of power delay values per antenna port towards another radio transceiver device. The processing circuitry is configured to cause the radio transceiver device to determine modified channel estimates per antenna port and frequency with the power delay values outside a threshold delay window being suppressed. The processing circuitry is configured to cause the radio transceiver device to determine directional beamforming weights for beam-formed transmission towards said another radio transceiver device based on the modified channel estimates per antenna port and frequency.

According to a third aspect there is presented a radio transceiver device for determining directional beamforming weights. The radio transceiver device comprises an obtain module configured to obtain, from measurements on reference signals, channel estimates per antenna port and frequency. The channel estimates are indicative of power delay values per antenna port towards another radio transceiver device. The radio transceiver device comprises a determine module configured to determine modified channel estimates per antenna port and frequency with the power delay values outside a threshold delay window being suppressed. The radio transceiver device comprises a determine module configured to determine directional beamforming weights for beam-formed transmission towards said another radio transceiver device based on the modified channel estimates per antenna port and frequency.

According to a fourth aspect there is presented a computer program for determining directional beamforming weights, the computer program comprising computer program code which, when run on a radio transceiver device, causes the radio transceiver device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this method, these radio transceiver devices, this computer program, and this computer program product enable directional beamforming weights to be determined.

Advantageously the determined directional beamforming weights efficiently reduces the delay spread.

Advantageously this method, these radio transceiver devices, this computer program, and this computer program product enable the ISI to be reduced, thereby improving the capacity of the communications network in which the radio transceivers are located.

Advantageously this method, these radio transceiver devices, this computer program, and this computer program product enable the length of the cyclic prefix, if used, to be reduced, thereby enabling the symbol rate to be increased.

Advantageously this method, these radio transceiver devices, this computer program, and this computer program product enable the use of an extended cyclic prefix to be avoided in scenarios with large delay spread.

Advantageously this method, these radio transceiver devices, this computer program, and this computer program product enable the use of short subframes, thereby supporting low latency.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
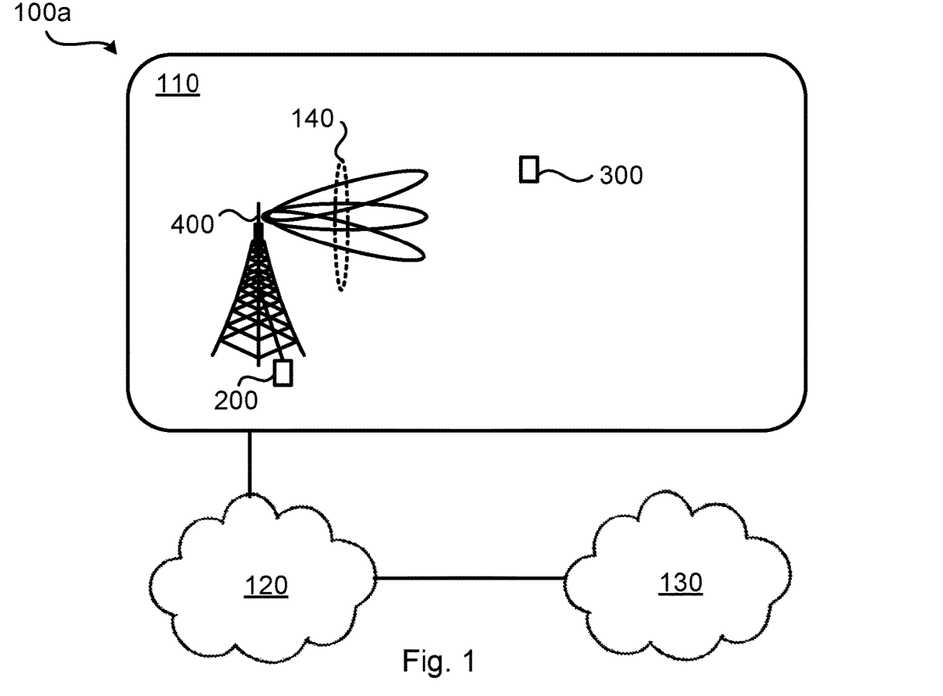
FIGS. 1 and 2 are schematic diagrams illustrating communications networks according to embodiments.

FIG. 1 is a schematic diagram illustrating a communications network 100a where embodiments presented herein can be applied. The communications network 100a could be a third generation (3G) telecommunications network, a fourth generation (4G) telecommunications network, or a fifth (5G) telecommunications network and support any 3GPP telecommunications standard.

The communications network 100a comprises a radio transceiver device 200 implemented as a network node and configured to, in a radio access network no, provide network access to another radio transceiver device 300 implemented as a terminal device. The radio access network 110 is operatively connected to a core network 120. The core network 120 is in turn operatively connected to a service network 130, such as the Internet. Radio transceiver device 300 is thereby, via radio transceiver device 200, enabled to access services of, and exchange data with, the service network 130. Examples of network nodes are radio access network nodes, radio base stations, base transceiver stations, Node Bs, evolved Node Bs, g Node Bs, access points, access nodes, antenna integrated radios (AIRs), and transmission and reception points (TRPs). Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

Radio transceiver device 200 provides network access in the radio access network 110 by transmitting signals to, and receiving signals from, radio transceiver device 300 in beams 140. The signals could be transmitted from, and received by, a network node 400, such as a transmission and reception point, of radio transceiver device 200. The network node 400 could form an integral part of radio transceiver device 200 or be physically separated from radio transceiver device 200.

Figure 2:
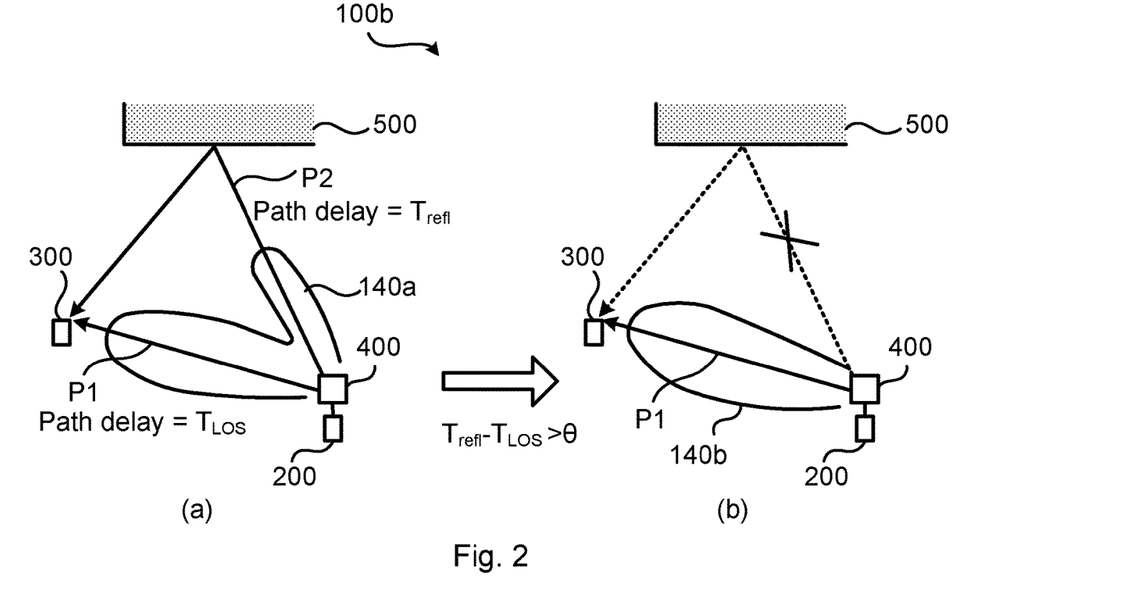

FIG. 2 schematically illustrates a communications network 100b representing a top view of a deployment scenario of the communications network 100a in FIG. 1. In the illustrative example of FIG. 2(a), radio transceiver device 200 uses a directional beam pattern 140a that utilizes two radio propagation paths P1 and P2 towards radio transceiver device 300. Radio propagation path P1 is in line of sight towards radio transceiver device 300 whereas radio propagation path P2 is reflected on a reflective object 500 before reaching radio transceiver device 300. Radio propagation path P1 has a path delay, or power delay value, $T_{LOS}$ and radio propagation path P2 has a path delay, or power delay value, $T_{refl}$.

It might be so that if the path delays, or power delay values, differ too much, for example more than a certain threshold value, θ, then this will result in intolerable ISI at radio transceiver device 300. Thus, if $T_{refl} - T_{LOS} > 0$, then it might be advantageous to adapt the directional beam pattern such that radio propagation path P2 is excluded, or at least suppressed, resulting in the directional beam pattern 140b of FIG. 2(b), where the two crossing lines forming an "X" symbolizes that radio propagation path P2 has been excluded, or at least suppressed.

The embodiments disclosed herein relate to mechanisms for determining directional beamforming weights that enable the directional beam pattern to be re-shaped such that radio propagation paths with too long path delays, or power delay values, are suppressed. In order to obtain such mechanisms there is provided a radio transceiver device 200, a method performed by radio transceiver device 200, a computer program product comprising code, for example in the form of a computer program, that when run on a radio transceiver device 200, causes radio transceiver device 200 to perform the method.

Figure 3:
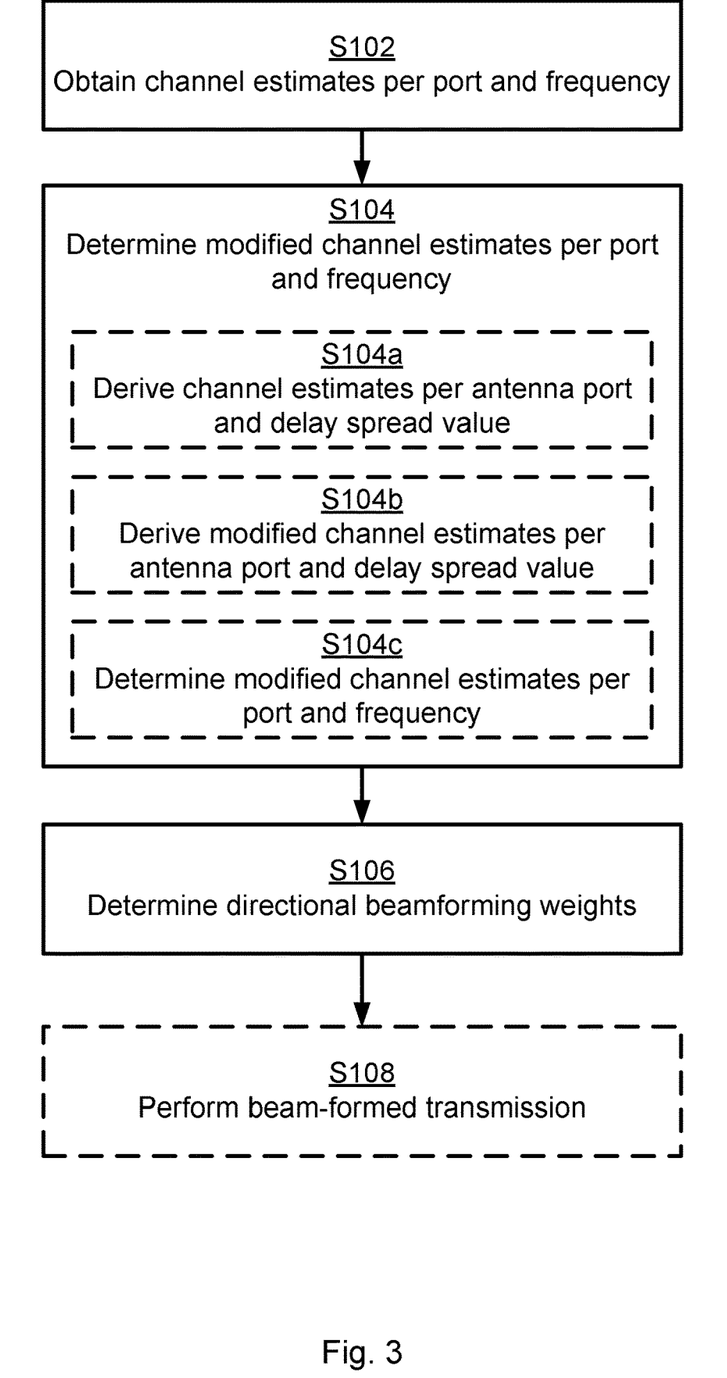
FIG. 3 is a flowchart of methods according to embodiments.

FIG. 3 is a flowchart illustrating embodiments of methods for determining directional beamforming weights. The methods are performed by radio transceiver device 200. The methods are advantageously provided as computer programs 920.

S102: Radio transceiver device 200 obtains, from measurements on reference signals, channel estimates per antenna port and frequency. In this respect it is understood that the channel estimates are per antenna port of radio transceiver device 200. The channel estimates are indicative of power delay values per antenna port towards radio transceiver device 300.

S104: Radio transceiver device 200 determines modified channel estimates per antenna port and frequency. In the modified channel estimates per antenna port and frequency the power delay values outside a threshold delay window are suppressed.

S106: Radio transceiver device 200 determines directional beamforming weights for beam-formed transmission towards radio transceiver device 300 based on the modified channel estimates per antenna port and frequency.

The resulting directional beam pattern (as obtained when applying the directional beamforming weights) will be reduced in the directions that include reflections with delay outside the threshold delay window.

Embodiments relating to further details of determining directional beamforming weights as performed by radio transceiver device 200 will now be disclosed.

In some aspects the distribution of power delay values represents the variance in power for radio propagation paths of different lengths. Transmitted power is in general propagated through multiple radio propagation paths (such as P1 and P2 in FIG. 2(a)) which have different delay and attenuation (propagation loss). Power delay values represent the power received per delay value.

Aspects of determining the modified channel estimates per antenna port and frequency will now be disclosed.

In some aspects, determining the modified channel estimates per antenna port and frequency is based on using channel estimates per antenna port and power delay value. Particularly, according to an embodiment radio transceiver device 200 is configured to perform (optional) steps S104a-S104c as part of determining the modified channel estimates per antenna port and frequency in step S104:

S104a: Radio transceiver device 200 derives channel estimates per antenna port and power delay value from the channel estimates per antenna port and frequency.

S104b: Radio transceiver device 200 derives modified channel estimates per antenna port and power delay value by suppressing, in the channel estimates per antenna port and power delay value, the power delay values being outside the threshold delay window.

S104c: Radio transceiver device 200 determines the modified channel estimates per antenna port and frequency from the modified estimates channel estimates per antenna port and power delay value.

Figure 4:
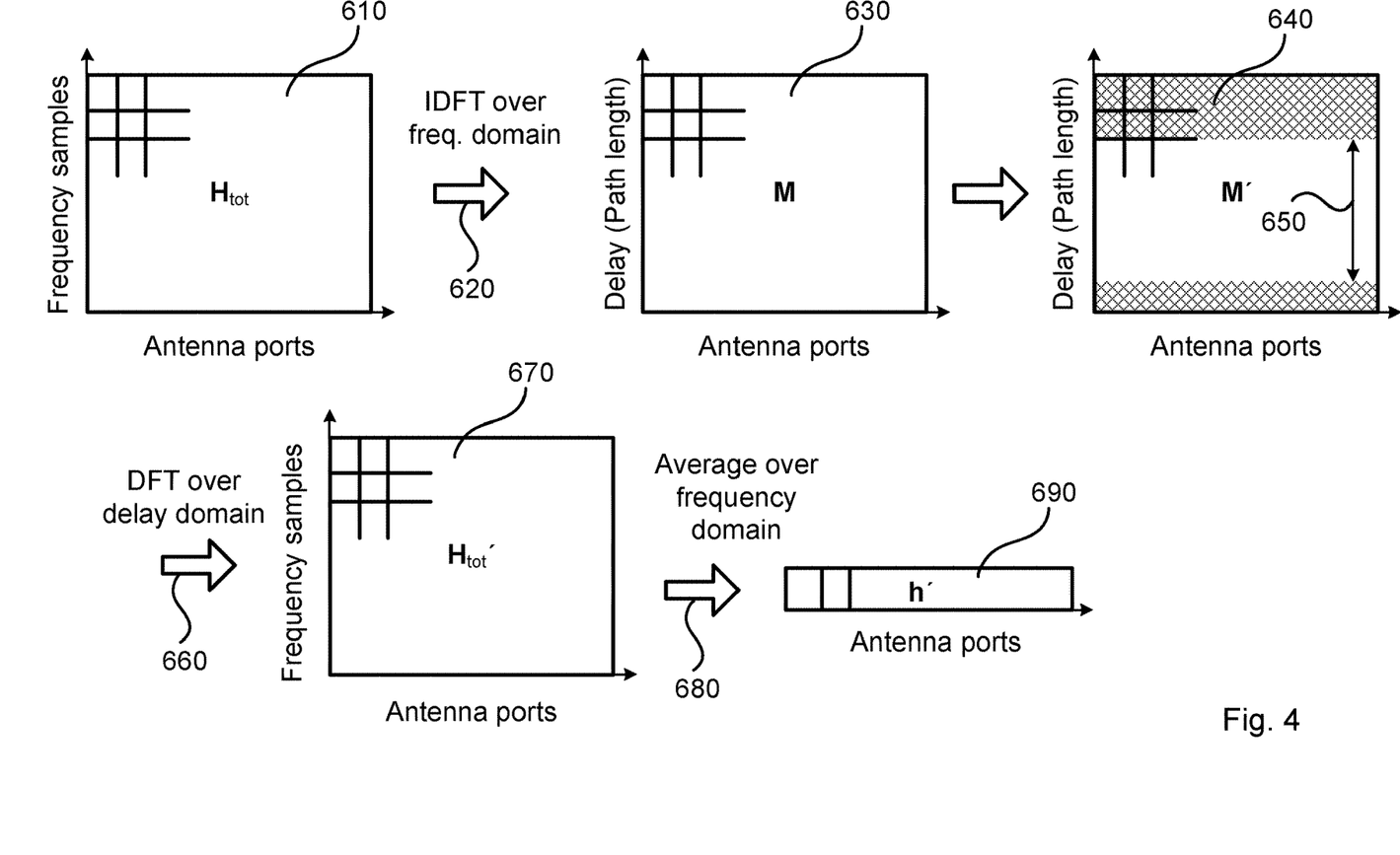
FIG. 4 schematically illustrates determination of directional beamforming weights from channel estimates per antenna port and frequency according to an embodiment.

Parallel reference will now be made to FIG. 4. FIG. 4 schematically illustrates an embodiment of determining directional beamforming weights from channel estimates per antenna port and frequency.

There could be different ways to obtain the channel estimates per antenna port and frequency.

In some aspects the radio propagation channel is measured over the antenna ports as well as over frequency and the measurements are collected in a channel matrix $H_{tot}$. Such a channel matrix $H_{tot}$ is illustrated at bio in FIG. 4. Particularly, according to an embodiment, the channel estimates per antenna port and frequency are represented by a channel matrix $H_{tot}$. In general terms, there is one two-dimensional channel matrix per frequency, and thus when taking also frequency in consideration, the channel matrix $H_{tot}$ has three dimensions; transmission port, reception port, and frequency.

In some aspects an inverse frequency transform is performed over the frequency domain to obtain a new matrix M with a delay profile per antenna port. Such an inverse frequency transform is schematically illustrated at arrow 620 in FIG. 4. Particularly, according to an embodiment, channel estimates per antenna port and power delay value are derived by performing an inverse frequency transform of the channel matrix $H_{tot}$ on each frequency array in the channel matrix $H_{tot}$, resulting in a power delay matrix M. Such a power delay matrix M is illustrated at 630 in FIG. 4. In this respect, one inverse frequency transform might be performed individually on each of the frequency arrays and not on the whole channel matrix $H_{tot}$ as such. In some aspects the inverse frequency transform is an inverse Fourier transform, such as an inverse discrete Fourier transform (IDFT) or an inverse fast Fourier transform (IFFT).

In some aspects the power delay values outside the threshold delay window are suppressed by all values above a certain delay value $d_{max}$ in M being suppressed, resulting in a new matrix M'. Such a matrix M' is schematically illustrated at 640 in FIG. 4. Here, the delay value $d_{max}$ could define the length of the threshold delay window, schematically illustrated at 650. Particularly, according to an embodiment, the power delay values outside the threshold delay window are suppressed in the power delay matrix M, resulting in a modified power delay matrix M'.

In some aspects a forward frequency transform is performed over the the modified matrix M', resulting in a matrix $H'_{tot}$. Such a forward frequency transform is schematically illustrated at arrow 660 in FIG. 4. Particularly, according to an embodiment, a modified channel matrix $H'_{tot}$ is derived by performing a frequency transform of the modified power delay matrix M' on each power delay array in the power delay matrix M'. Such a modified channel matrix $H'_{tot}$ is illustrated at 670 in FIG. 4. In this respect, one frequency transform might be performed individually on each of the power delay arrays and not on the whole power delay matrix M'. In some aspects the forward frequency transform is a Fourier transform, such as a discrete Fourier transform (DFT) or a fast Fourier transform (FFT).

In some aspects the modified channel matrix $H'_{tot}$ is aggregated in the frequency domain in order to obtain a channel vector h' with the frequency dimension eliminated and that thus is feasible for frequency-wide beamforming. Such modification is schematically illustrated at arrow 680 and such a channel vector h' is schematically illustrated at 690 in FIG. 4.

Particularly, according to an embodiment, a channel vector h' is obtained by frequency-wise aggregating the modified channel matrix $H'_{tot}$.

Aspects of determining the directional beamforming weights will now be disclosed.

There could be different ways to determine the directional beamforming weights from the modified channel estimates per antenna port and frequency. All beamforming methods that can be applied based on the original $H_{tot}$ can be applied equally on $H'_{tot}$ or h' (as exemplified in the following examples).

In some aspects the conjugate $H''_{tot}$ of the modified channel matrix $H'_{tot}$ or the conjugate h'' of the channel vector h' is used as transmission beam forming weights. Particularly, according to an embodiment, the directional beamforming weights are represented by $H''_{tot}$ or h'', where $H''_{tot}$ is obtained by conjugating the modified channel matrix $H'_{tot}$, and where h'' is obtained by conjugating the channel vector h'.

In some aspects the transmission beam forming weights are determined using singular value decomposition (SVD) of $H'_{tot}$ or h'. In general terms, a SVD is applied for extracting the singular values and the rotation matrices U and V from $H'_{tot}$. For transmission of N spatial multiplexing layers the conjugate of the first N rows of V is used as for the conjugate beamforming of each layer.

There could be different ways to determine the length of the threshold delay window.

In some aspects the beam-formed transmission towards radio transceiver device 300 uses a cyclic prefix. In this respect, the term cyclic prefix generally refers to the prefixing of a symbol, with a repetition of the end. In some aspects the length of the threshold delay window is proportional to the length of the cyclic prefix. Particularly, according to an embodiment, the threshold delay window has a length that is proportional to the length of the cyclic prefix.

In some aspects the length of the threshold delay window is shorter than, equal to, or slightly longer than, the cyclic prefix length. Particularly, according to an embodiment, the length of the threshold delay window is within 20%, preferably 10%, most preferably 5%, within the length of the cyclic prefix. In this respect, the impact of radio propagation paths with long delays on the ISI is generally proportional to their corresponding strength but also to the delay exceeding the cyclic prefix length. Hence the length of the threshold delay window can be selected as longer than the cyclic prefix, thereby not suppressing radio propagation paths with less significant impact on ISI.

In some aspects the length of the threshold delay window is based on signal to interference plus noise ratio (SINR) estimates. Particularly, according to an embodiment, the measurements on the reference signals are indicative of a SINR, and the threshold delay window has a length that is proportional to the SINR.

In some aspects, radio propagation paths with short delays might be strong (in energy sense) and thus desired to be utilized. But there might be some radio propagation paths with short delays that are weak (in energy sense) due to diffraction. Therefore, the length threshold delay window might be adapted according to the sum of amplitude, or energy, of the radio propagation paths. Particularly, according to an embodiment, the threshold delay window has a length that is dependent on energy concentration of the power delay values per antenna port.

There could be different ways to suppress the power delay values outside the threshold delay window.

In some aspects the suppressing is hard, resulting in exclusion of the power delay values outside the threshold delay window. Particularly, according to an embodiment, the power delay values are suppressed by being excluded from the modified channel estimates.

In some aspects the suppressing is soft, whereby the power delay values outside the threshold delay window are multiplied by weighting factors w, where 0<w<1 such that the directional contribution from these power delay values is reduced. Particularly, according to an embodiment, the power delay values are suppressed by being subjected to weighting factors. The weighting factors are determined as a function of the power delay values outside the threshold delay window.

There could be different configurations of the antenna ports. In some aspects there are at least two antenna ports. Particularly, according to an embodiment, the reference signals are received on at least two antenna ports of radio transceiver device 200.

For example, in a communications network based on time division duplex (TDD) where there is channel reciprocity between the uplink and downlink, a transmitting radio transceiver device 200 might on its transmitter antennas listen to reference signals sent from an intended receiver. Particularly, according to an embodiment, the reference signals are received on antenna ports used for the beam-formed transmission towards radio transceiver device 300.

There could be different examples of directional beamforming weights. Particularly, according to an embodiment, the directional beamforming weights are precoder weights.

In some aspects the determined directional beamforming weights are applied during transmission from radio transceiver device 200 towards radio transceiver device 300. According to an embodiment radio transceiver device 200 is configured to perform (optional) step S108:

S108: Radio transceiver device 200 performs beam-formed transmission, using the directional beamforming weights, towards radio transceiver device 300.

However, although the herein disclosed embodiments have been illustrated in the context of determining directional beamforming weights for beam-formed transmission, the herein disclosed embodiments are equally applicable for beam-formed reception and the determining of directional beamforming weights for beam-formed reception.

Figure 5:
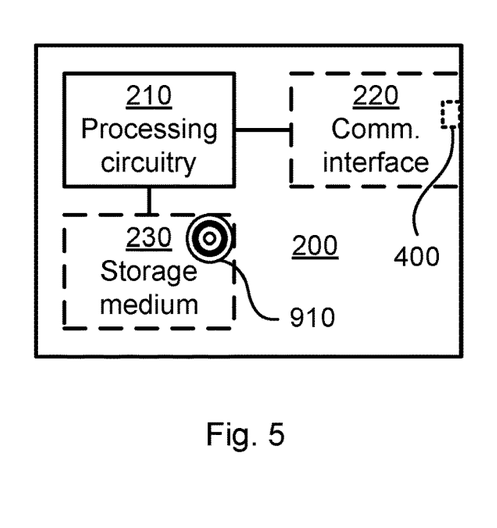
FIG. 5 is a schematic diagram showing functional units of a radio transceiver device according to an embodiment.

FIG. 5 schematically illustrates, in terms of a number of functional units, the components of a radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause radio transceiver device 200 to perform a set of operations, or steps, S102-S108, as disclosed above. For example, the storage medium 230 may store the set of operations, and the processing circuitry 210 may be configured to retrieve the set of operations from the storage medium 230 to cause radio transceiver device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. Radio transceiver device 200 may further comprise a communications interface 220 at least configured for communications with other nodes, device, functions, and notes of the communications network 100a, 100b. As such the communications interface 220 may comprise one or more transmitters and receivers, comprising analogue and digital components. Signals could be transmitted from, and received by, a network node 400 of radio transceiver device 200. The network node 400 could form an integral part of radio transceiver device 200 or be physically separated from radio transceiver device 200. The communications interface 220 might thus optionally comprise the network node 400.

The processing circuitry 210 controls the general operation of radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of radio transceiver device 200 are omitted in order not to obscure the concepts presented herein.

Figure 6:
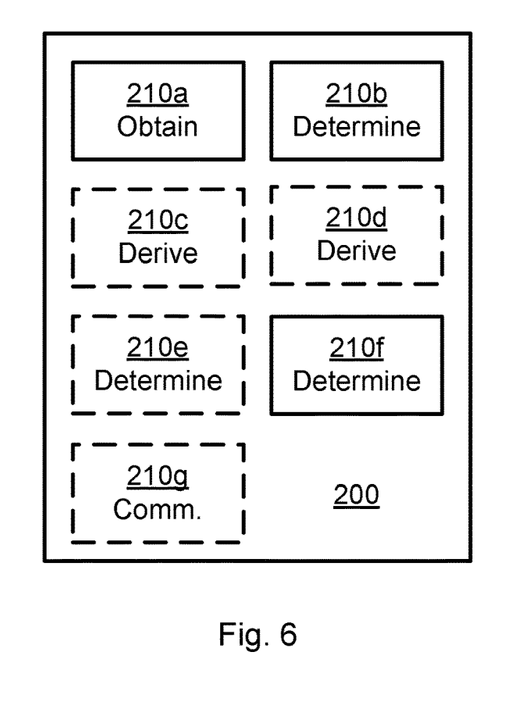
FIG. 6 is a schematic diagram showing functional modules of a radio transceiver device according to an embodiment.

FIG. 6 schematically illustrates, in terms of a number of functional modules, the components of a radio transceiver device 200 according to an embodiment. Radio transceiver device 200 of FIG. 6 comprises a number of functional modules; an obtain module 210a configured to perform step S102, a determine module 210b configured to perform step S104, and a determine module 210C configured to perform step S106. Radio transceiver device 200 of FIG. 6 may further comprise a number of optional functional modules, such as any of a derive module 210C configured to perform step S104a, a derive module 210d configured to perform step S104b, a determine module 210e configured to perform step S104c, and a communications module 210g configured to perform step S108. In general terms, each functional module 210a-210g may in one embodiment be implemented only in hardware and in another embodiment with the help of software, i.e., the latter embodiment having computer program instructions stored on the storage medium 230 which when run on the processing circuitry makes radio transceiver device 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210g may be implemented by the processing circuitry 210, possibly in cooperation with the communications interface 220 and/or the storage medium 230. The processing circuitry 210 may thus be configured to from the storage medium 230 fetch instructions as provided by a functional module 210a-210g and to execute these instructions, thereby performing any steps as disclosed herein.

Figure 7:
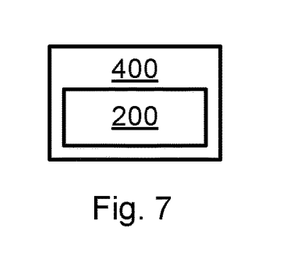
FIG. 7 schematically illustrates a network node according to an embodiment.
Figure 8:
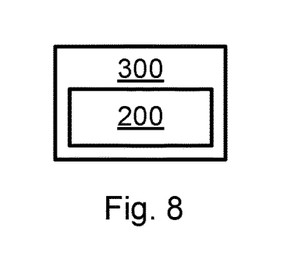
FIG. 8 schematically illustrates a terminal device according to an embodiment.

Radio transceiver device 200 may be provided as a standalone device or as a part of at least one further device. For example, radio transceiver device 200 may be provided in the network node 400 and/or in the terminal device. Hence, according to some aspects there is provided a network node 400 comprising a radio transceiver device 200 as herein disclosed. FIG. 7 schematically illustrates a network node 400 comprising a radio transceiver device 200 as herein disclosed. Further, according to some aspects there is provided a terminal device comprising a radio transceiver device 200 as herein disclosed. FIG. 8 schematically illustrates a radio transceiver device 300 embodied as a terminal device comprising a radio transceiver device 200 as herein disclosed.

Further, functionality of radio transceiver device 200 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the radio access network no than instructions that are not required to be performed in real time.

Thus, a first portion of the instructions performed by radio transceiver device 200 may be executed in a first device, and a second portion of the of the instructions performed by radio transceiver device 200 may be executed in a second device; the herein disclosed embodiments are not limited to any particular number of devices on which the instructions performed by radio transceiver device 200 may be executed. Hence, the methods according to the herein disclosed embodiments are suitable to be performed by a radio transceiver device 200 residing in a cloud computational environment. Therefore, although a single processing circuitry 210 is illustrated in FIG. 5 the processing circuitry 210 may be distributed among a plurality of devices, or nodes. The same applies to the functional modules 210a-210g of FIG. 6 and the computer program 920 of FIG. 9 (see below).

Figure 9:
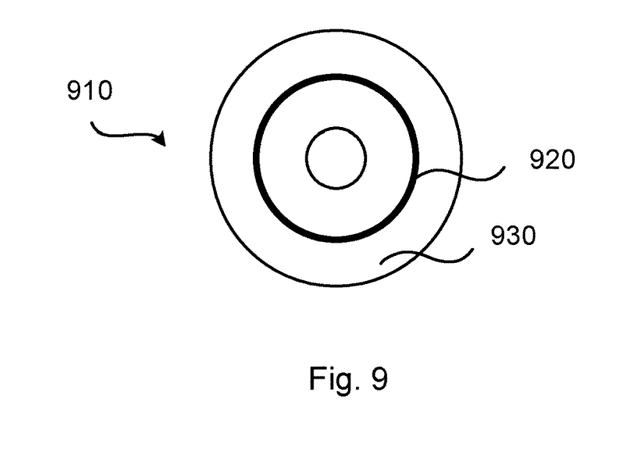
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining directional beamforming weights, the method being performed by a radio transceiver device, the method comprising:
   obtaining, from measurements on reference signals, channel estimates per antenna port and frequency, wherein the channel estimates are indicative of power delay values per antenna port towards another radio transceiver device;
   determining modified channel estimates per antenna port and frequency with the power delay values outside a threshold delay window being suppressed,
      wherein the measurements on the reference signals are indicative of a signal to interference plus noise ratio (SINR), and wherein the threshold delay window has a length that is proportional to the SINR; and
   determining directional beamforming weights for beam-formed transmission towards said another radio transceiver device based on the modified channel estimates per antenna port and frequency.

2. The method according to claim 1, wherein determining the modified channel estimates per antenna port and frequency comprises:
   deriving channel estimates per antenna port and power delay value from the channel estimates per antenna port and frequency;
   deriving modified channel estimates per antenna port and power delay value by suppressing, in the channel estimates per antenna port and power delay value, the power delay values being outside the threshold delay window; and
   determining the modified channel estimates per antenna port and frequency from the modified estimates channel estimates per antenna port and power delay value.

3. The method according to claim 1, wherein the channel estimates per antenna port and frequency are represented by a channel matrix $H_{tot}$.

4. The method according to claim 3, wherein channel estimates per antenna port and power delay value are derived by performing an inverse frequency transform of the channel matrix $H_{tot}$ on each frequency array in the channel matrix $H_{tot}$, resulting in a power delay matrix M.

5. The method according to claim 4, wherein the power delay values outside the threshold delay window are suppressed in the power delay matrix M, resulting in a modified power delay matrix M'.

6. The method according to claim 5, wherein a modified channel matrix $H'_{tot}$ is derived by performing a frequency transform of the modified power delay matrix M' on each power delay array in the power delay matrix M'.

7. The method according to claim 6, wherein a channel vector h' is obtained by frequency-wise aggregating the modified channel matrix $H'_{tot}$.

8. The method according to claim 7, wherein the directional beamforming weights are represented by $H'^*_{tot}$ or $h'^*$, where $H'^*_{tot}$ is obtained by conjugating the modified channel matrix $H'_{tot}$, and where $h'^*$ is obtained by conjugating the channel vector h'.

9. The method according to claim 1, wherein the beam-formed transmission towards said another radio transceiver device uses a cyclic prefix.

10. The method according to claim 9, wherein the threshold delay window has a length that is proportional to a length of the cyclic prefix and is within 20%, preferably 10%, most preferably 5%, within the length of the cyclic prefix.

11. The method according to claim 1, wherein the threshold delay window has a length that is dependent on energy concentration of the power delay values per antenna port.

12. The method according to claim 1, wherein the power delay values are suppressed by being excluded from the modified channel estimates.

13. The method according to claim 1, wherein the power delay values are suppressed by being subjected to weighting factors, wherein the weighting factors are determined as a function of the power delay values outside the threshold delay window.

14. The method according to claim 1, wherein the reference signals are received on at least two antenna ports of the radio transceiver device.

15. The method according to claim 1, wherein the reference signals are received on antenna ports used for the beam-formed transmission towards said another radio transceiver device.

16. The method according to claim 1, wherein the directional beamforming weights are precoder weights.

17. The method according to claim 1, further comprising:
   performing beam-formed transmission, using the directional beamforming weights, towards said another radio transceiver device.

18. A radio transceiver device for determining directional beamforming weights, the radio transceiver device comprising processing circuitry, the processing circuitry being configured to cause the radio transceiver device to:
   obtain, from measurements on reference signals, channel estimates per antenna port and frequency, wherein the channel estimates are indicative of power delay values per antenna port towards another radio transceiver device;
   determine modified channel estimates per antenna port and frequency with the power delay values outside a threshold delay window being suppressed,
      wherein the measurements on the reference signals are indicative of a signal to interference plus noise ratio (SINR), and wherein the threshold delay window has a length that is proportional to the SINR; and
   determine directional beamforming weights for beam-formed transmission towards said another radio transceiver device based on the modified channel estimates per antenna port and frequency.

19. A terminal device comprising a radio transceiver device for determining directional beamforming weights, the radio transceiver device comprising processing circuitry, the processing circuitry being configured to cause the radio transceiver device to:
   obtain, from measurements on reference signals, channel estimates per antenna port and frequency, wherein the channel estimates are indicative of power delay values per antenna port towards another radio transceiver device;

determine modified channel estimates per antenna port and frequency with the power delay values outside a threshold delay window being suppressed, wherein the measurements on the reference signals are indicative of a signal to interference plus noise ratio (SINR), and wherein the threshold delay window has a length that is proportional to the SINR; and determine directional beamforming weights for beamformed transmission towards said another radio transceiver device based on the modified channel estimates per antenna port and frequency.

* * * * *